United States Patent
Barkan et al.

(10) Patent No.: US 11,960,964 B2
(45) Date of Patent: *Apr. 16, 2024

(54) BIOPTIC SCANNER OPTICAL ARRANGEMENT WITH SINGLE SENSOR SPLIT FOUR WAYS

(71) Applicant: ZEBRA TECHNOLOGIES CORPORATION, Lincolnshire, IL (US)

(72) Inventors: Edward Barkan, Miller Place, NY (US); Darran Michael Handshaw, Sound Beach, NY (US); Mark Drzymala, Saint James, NY (US)

(73) Assignee: Zebra Technologies Corporation, Lincolnshire, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/119,427

(22) Filed: Mar. 9, 2023

(65) Prior Publication Data
US 2023/0214614 A1  Jul. 6, 2023

Related U.S. Application Data

(63) Continuation of application No. 17/397,618, filed on Aug. 9, 2021, now Pat. No. 11,630,967, which is a (Continued)

(51) Int. Cl.
*G06K 7/10* (2006.01)
*G06K 7/14* (2006.01)

(52) U.S. Cl.
CPC ....... *G06K 7/1096* (2013.01); *G06K 7/10623* (2013.01); *G06K 7/10702* (2013.01); *G06K 7/1408* (2013.01); *G06K 7/1413* (2013.01)

(58) Field of Classification Search
CPC ............ G06K 7/1096; G06K 7/10623; G06K 7/10702
(Continued)

(56) References Cited

U.S. PATENT DOCUMENTS 8,608,076 B2   12/2013   Olmstead
2009/0268983 A1   10/2009   Stone et al.
(Continued)

OTHER PUBLICATIONS

Office Action for German Application No. 112020005515.9 dated Mar. 3, 2023.
(Continued)

*Primary Examiner* — Allyson N Trail
(74) *Attorney, Agent, or Firm* — Yuri Astvatsaturov

(57) ABSTRACT

A bioptic scanner optical arrangement with a single sensor split four ways is disclosed herein. An example bioptic scanner optical arrangement includes a housing, an imaging assembly having a primary FOV, a decode module, a generally horizontal window supported by the housing, a generally upright window supported by the housing, and a mirror arrangement positioned within the interior region. The mirror arrangement is configured to divide the primary FOV into a plurality of subfields, to redirect at least one of the plurality of subfields through the generally horizontal window, and to redirect at least another two of the plurality of subfields through the generally upright window. The bioptic barcode reader has no other imaging assembly communicatively coupled to the decode module and used to process images for decoding indicia.

11 Claims, 7 Drawing Sheets

Related U.S. Application Data continuation of application No. 16/678,239, filed on Nov. 8, 2019, now Pat. No. 11,120,237.

(58) Field of Classification Search
USPC .................................................. 235/462.32
See application file for complete search history.

(56) References Cited

U.S. PATENT DOCUMENTS

| | | |
|---|---|---|
| 2010/0163626 A1 | 7/2010 | Olmstead |
| 2014/0183262 A1 | 7/2014 | Wittenberg et al. |
| 2017/0299864 A1 | 10/2017 | Vallius et al. |

OTHER PUBLICATIONS

International Search Report and Written Opinion for International Application No. PCT/US2020/051382 dated Dec. 12, 2020.

BIOPTIC SCANNER OPTICAL ARRANGEMENT WITH SINGLE SENSOR SPLIT FOUR WAYS

CROSS-REFERENCE TO RELATED APPLICATION

This application is a continuation of U.S. patent application Ser. No. 17/397,618, filed on Aug. 9, 2021, which is a continuation of U.S. patent application Ser. No. 16/678,239, filed on Nov. 8, 2019, both of which are incorporated herein by reference in their entirety.

BACKGROUND OF THE INVENTION

Bioptic barcode readers allow fast checkout in cashier-manned and self-checkout lanes in retail environments. In some configurations, such barcode readers may include a horizontal window and an upright window in order to provide a large scan area that can effectively read a barcode on a swiped product. Each window is generally associated with an imaging assembly having an image sensor, meaning that at least two image sensors are required per barcode reader. Each image sensor is also typically associated with a mirror arrangement to direct the field of view (FOV) of each imaging assembly. The plurality of image sensors and the plurality of mirror arrangements contribute to the overall complexity and cost of each barcode reader. Reducing the cost and complexity of a barcode reader is desirable but is also known to reduce the efficacy of the barcode reader.

SUMMARY

According to a first aspect, a bioptic barcode reader for capturing images of targets presented in a product-scanning region of the bioptic barcode reader includes a housing, an imaging assembly, a decode module, a generally horizontal window, a generally upright window, and a mirror arrangement. The housing has an interior region. The imaging assembly has a primary FOV and an image sensor with a plurality of photosensitive elements forming a substantially flat surface. The decode module is communicatively coupled to the imaging assembly and configured to decode a barcode captured in an image by the imaging assembly. The generally horizontal window is supported by the housing and is configured to allow a first light to pass between the product-scanning region and the interior region of the housing. The generally upright window is supported by the housing and is configured to allow a second light to pass between the product-scanning region and the interior region of the housing. The mirror arrangement is positioned within the interior region and is configured to divide the primary FOV into a plurality of subfields. The mirror arrangement is further configured to redirect at least two of the plurality of subfields through the generally horizontal window, and to redirect at least another two of the plurality of subfields through the generally upright window. The bioptic barcode reader has no other imaging assembly communicatively coupled to the decode module and used to process images for decoding indicia.

According to a second aspect, a bioptic barcode reader for capturing images of targets presented in a product-scanning region of the bioptic barcode reader includes a housing, an imaging assembly, a decode module, a generally horizontal window, a generally upright window, and a mirror arrangement. The housing has an interior region. The imaging assembly has a primary FOV and an image sensor with a plurality of photosensitive elements forming a substantially flat surface. The decode module is communicatively coupled to the imaging assembly and configured to decode a barcode captured in an image by the imaging assembly. The generally horizontal window is supported by the housing and is configured to allow a first light to pass between the product-scanning region and the interior region of the housing. The generally upright window is supported by the housing and is configured to allow a second light to pass between the product-scanning region and the interior region of the housing. The mirror arrangement is positioned within the interior region. The mirror arrangement is configured to divide the primary FOV into a first subfield, a second subfield, a third subfield, and a fourth subfield such that the first subfield is associated with a first quadrant of the substantially flat surface of the image sensor, the second subfield is associated with a second quadrant of the substantially flat surface of the image sensor, the third subfield is associated with a third quadrant of the substantially flat surface of the image sensor, and the fourth subfield is associated with a fourth quadrant of the substantially flat surface of the image sensor.

In some forms, the plurality of subfields may include a first subfield, a second subfield, a third subfield, and a fourth subfield. The first subfield may be associated with a first quadrant of the substantially flat surface of the image sensor. The second subfield may be associated with a second quadrant of the substantially flat surface of the image sensor. The third subfield may be associated with a third quadrant of the substantially flat surface of the image sensor. The fourth subfield may be associated with a fourth quadrant of the substantially flat surface of the image sensor.

In some forms, each of the first quadrant, the second quadrant, the third quadrant, and the fourth quadrant may be dimensionally equal to each other of the first quadrant, the second quadrant, the third quadrant, and the fourth quadrant. In other forms, each of the first quadrant, the second quadrant, the third quadrant, and the fourth quadrant may be a proportionally equal portion of the substantially flat surface of the image sensor.

In some forms, the orientation of each of the first quadrant, the second quadrant, the third quadrant, and the fourth quadrant may be equal to an orientation of the substantially flat surface of the image sensor.

In some forms, the mirror arrangement may include a first fold mirror positioned directly within a first path of a first portion of the primary FOV. The first fold mirror may be configured to redirect the first portion of the primary FOV from a first path to a second path. The mirror arrangement may further include a first set of splitter mirrors positioned directly within the second path. The first set of splitter mirrors may be configured to split the first portion of the primary FOV into a first subfield and a second subfield. The first set of splitter mirrors may be further configured to redirect the first subfield along a third path and redirect the second subfield along a fourth path. A second fold mirror may be positioned directly within the third path and configured to redirect the first subfield through the generally upright window. A third fold mirror may be positioned directly within the fourth path and configured to redirect the second subfield through the generally upright window. In still more forms, upon being redirected by the first set of splitter mirrors, the first subfield and the second subfield may at least partially overlap.

In some forms, the mirror arrangement may include a second set of splitter mirrors positioned directly within a fifth path of a second portion of the primary FOV. The second set of splitter mirrors may be configured to split the second portion of the primary FOV into a third subfield and a fourth subfield. The second set of splitter mirrors may be further configured to redirect the third subfield along a sixth path and redirect the fourth subfield along a seventh path. A fourth fold mirror may be positioned directly within the sixth path and configured to redirect the third subfield along an eighth path. A fifth fold mirror may be positioned directly within the eighth path and configured to redirect the third subfield through the generally horizontal window. A sixth fold mirror may be positioned directly within the seventh path and configured to redirect the fourth subfield along a ninth path. A seventh fold mirror may be positioned directly within the ninth path and configured to redirect the fourth subfield through the generally horizontal window.

In some forms, upon being redirected by the first set of splitter mirrors, the first subfield and the second subfield may at least partially overlap, and upon being redirected by the second set of splitter mirrors, the third subfield and the fourth subfield may at least partially overlap.

In still other forms, the first set of splitter mirrors may be located above a plane defined by the generally horizontal window relative to the imaging assembly. The second set of splitter mirrors may be located below the plane defined by the generally horizontal window relative to the imaging assembly.

In some forms, a first optical length from the image sensor to the generally horizontal window may be different from a second optical length from the image sensor to the generally upright window. The first optical length may be measured along the primary FOV and one of the plurality of subfields that passes through the generally horizontal window. The second optical length may be measured along the primary FOV and one of the plurality of subfields that passes through the generally upright window. In some forms, the first optical length may be longer than the second optical length.

In some forms, the bioptic barcode reader may have no other imaging assembly communicatively coupled to the decode module and used to process images for decoding indicia.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
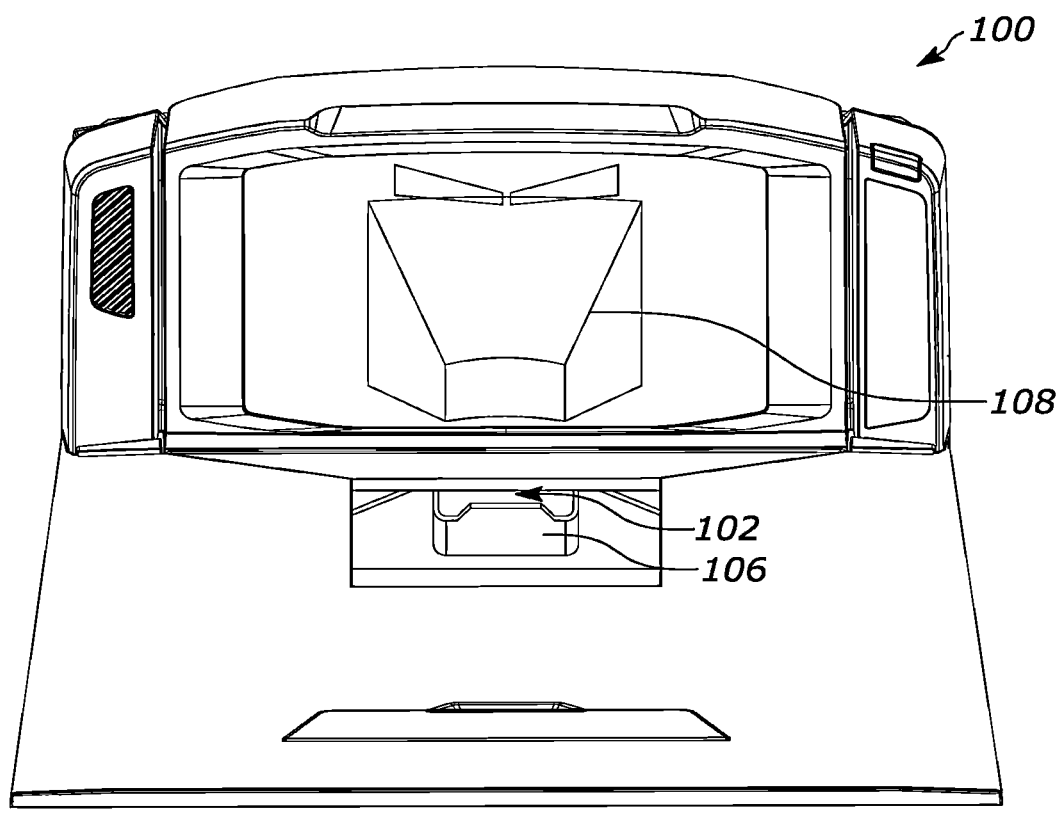
FIG. 1 is a front isometric view of a bioptic barcode reader of the present disclosure.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Turning to the figures, as shown in FIG. 1, a bioptic barcode reader 100 is shown. The bioptic barcode reader 100 is used to capture images of targets presented in a product-scanning region 102. The bioptic barcode reader 100 has a housing 104 that supports a generally horizontal window 106 and a generally upright window 108. For purposes of this specification, a generally horizontal window 106 may be positioned up to and including 45 degrees above or below a horizontal plane. For purposes of this specification, a generally upright window 108 may be positioned up to and including 45 degrees in front or behind a vertical plane. In the bioptic barcode reader 100 shown in FIG. 1, the generally horizontal window 106 is perpendicular to the generally vertical window 108. However, in other arrangements not herein depicted, the generally horizontal window 106 may be angled obtusely or acutely relative to the generally vertical window 108.

Figure 2:
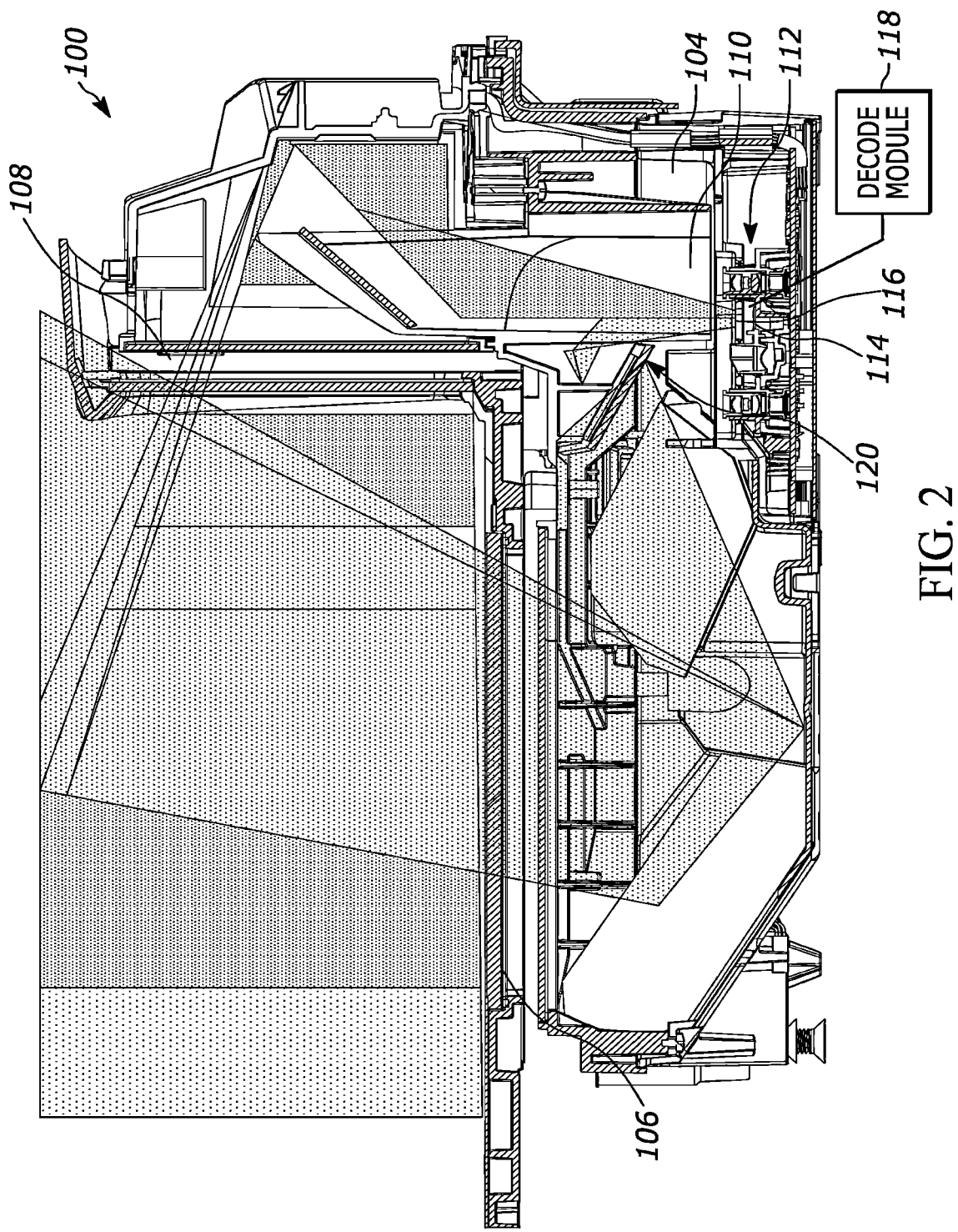
FIG. 2 is a side cross-sectional view of the bioptic barcode reader of FIG. 1.

As shown in FIG. 2, the housing 104 of the bioptic barcode reader 100 has an interior region 110. The generally horizontal window 106 is configured to allow a first light to pass between the product-scanning region 102 and the interior region 110 of the housing 104. The generally upright window 108 is configured to allow a second light to pass between the product-scanning region 102 and the interior region 110 of the housing 104. An imaging assembly 112 is provided in the interior region 110. The imaging assembly 112 has a primary field of view (FOV) and includes a single image sensor 114. The image sensor 114 has a plurality of photosensitive elements forming a substantially flat surface 116. A decode module 118 (shown schematically) is communicatively coupled with the imaging assembly 112. The decode module 118 is configured to decode a barcode captured in an image by the imaging assembly 112. Only the imaging assembly 112 is communicatively coupled to the decode module 118 and is used to process images for decoding indicia. Put differently, the bioptic barcode reader 100 uses only (i.e., no additional) the single imaging assembly 112.

As also shown in FIG. 2, a mirror arrangement 120 is positioned within the interior region 110 of the housing 104. The mirror arrangement 120 is configured to divide the primary FOV into a plurality of subfields. The mirror arrangement 120 then redirects at least two of the plurality of subfields through the generally horizontal window 106 and redirects at least another two of the plurality of subfields through the generally upright window 108.

Figure 3:
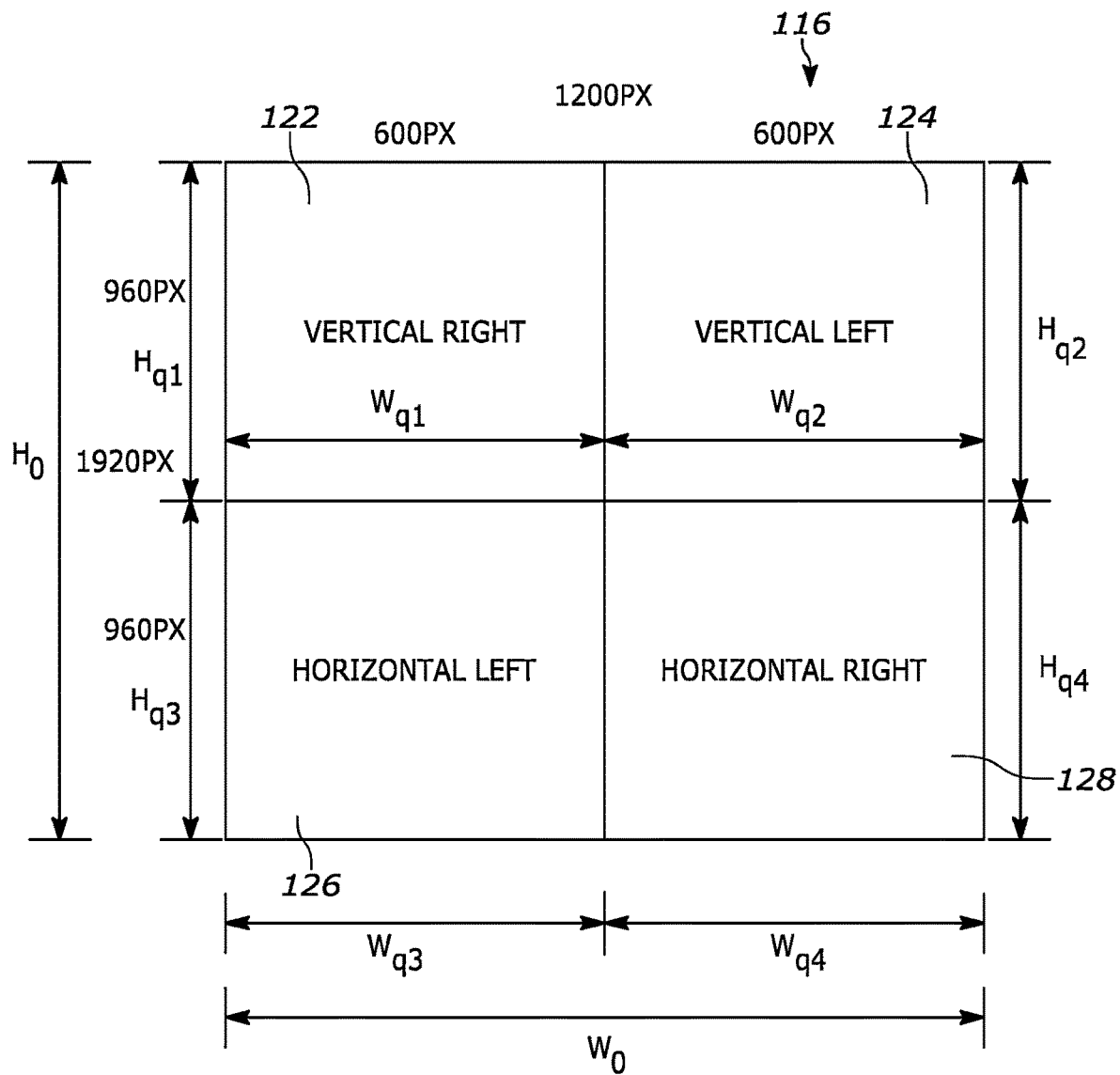
FIG. 3 illustrates quadrants of a flat surface of the image sensor of the bioptic barcode reader of FIGS. 1 and 2.

More specifically, the plurality of subfields into which the mirror arrangement 120 divides the primary FOV includes a first subfield, a second subfield, a third subfield, and a fourth subfield. FIG. 3 depicts the substantially flat surface 116 of the image sensor 114. The substantially flat surface 116 has a first quadrant 122, a second quadrant 124, a third quadrant 126, and a fourth quadrant 128. The first subfield is associated with the first quadrant 122. The second subfield is associated with the second quadrant 124. The third subfield is associated with the third quadrant 126. The fourth subfield is associated with the fourth quadrant 126. In FIG. 3, each of the first quadrant 122, the second quadrant 124, the third quadrant 126, and the fourth quadrant 128 are dimensionally equal to each other of first quadrant 122, the second quadrant 124, the third quadrant 126, and the fourth quadrant 128. Further, each of the first quadrant 122, the second quadrant 124, the third quadrant 126, and the fourth quadrant 128 is a proportionally equal portion of the substantially flat surface 116 of the image sensor 114. In other arrangements not shown herein, the quadrants 122, 124, 126, and 128 may not be dimensionally equal to each other and/or proportionally equal portions of the substantially flat surface 116 of the image sensor 114.

As further shown in FIG. 3, an orientation of each of the first quadrant 122, the second quadrant 124, the third quadrant 126, and the fourth quadrant 128 is equal to an orientation of the substantially flat surface 116. That is, if the substantially flat surface 116 has a landscape orientation having an overall width $W_o$ that is greater than the overall height $H_o$, then each quadrant (first, second, third, and fourth) has a respective quadrant width ($W_{q1}$, $W_{q2}$, $W_{q3}$, $W_{q4}$) that is greater than a respective quadrant height ($H_{q1}$, $H_{q2}$, $H_{q3}$, $H_{q4}$). Alternately, if the substantially flat surface 116 has a portrait orientation having an overall width $W_o$ that is less than the overall height $H_o$, then each quadrant (first, second, third, and fourth) has a respective quadrant width ($W_{q1}$, $W_{q2}$, $W_{q3}$, $W_{q4}$) that is less than a respective quadrant height ($H_{q1}$, $H_{q2}$, $H_{q3}$, $H_{q4}$).

Optionally, the first quadrant 122 and the second quadrant 124 may have heights $H_{q1}$ and $H_{q2}$ that are greater than or less than the heights $H_{q3}$ and $H_{q4}$ of the third quadrant 126 and the fourth quadrant 128. Specifically, having heights $H_{q1}$ and $H_{q2}$ be greater than heights $H_{q3}$ and $H_{q4}$ may be desirable as it may be more cost effective to have the generally upright window 108 be larger than the generally horizontal window 106. That is because the generally horizontal window 106 may need sapphire glass for durability purposes whereas such specialty glass is less likely to be necessary for the generally upright window 108.

Figure 4:
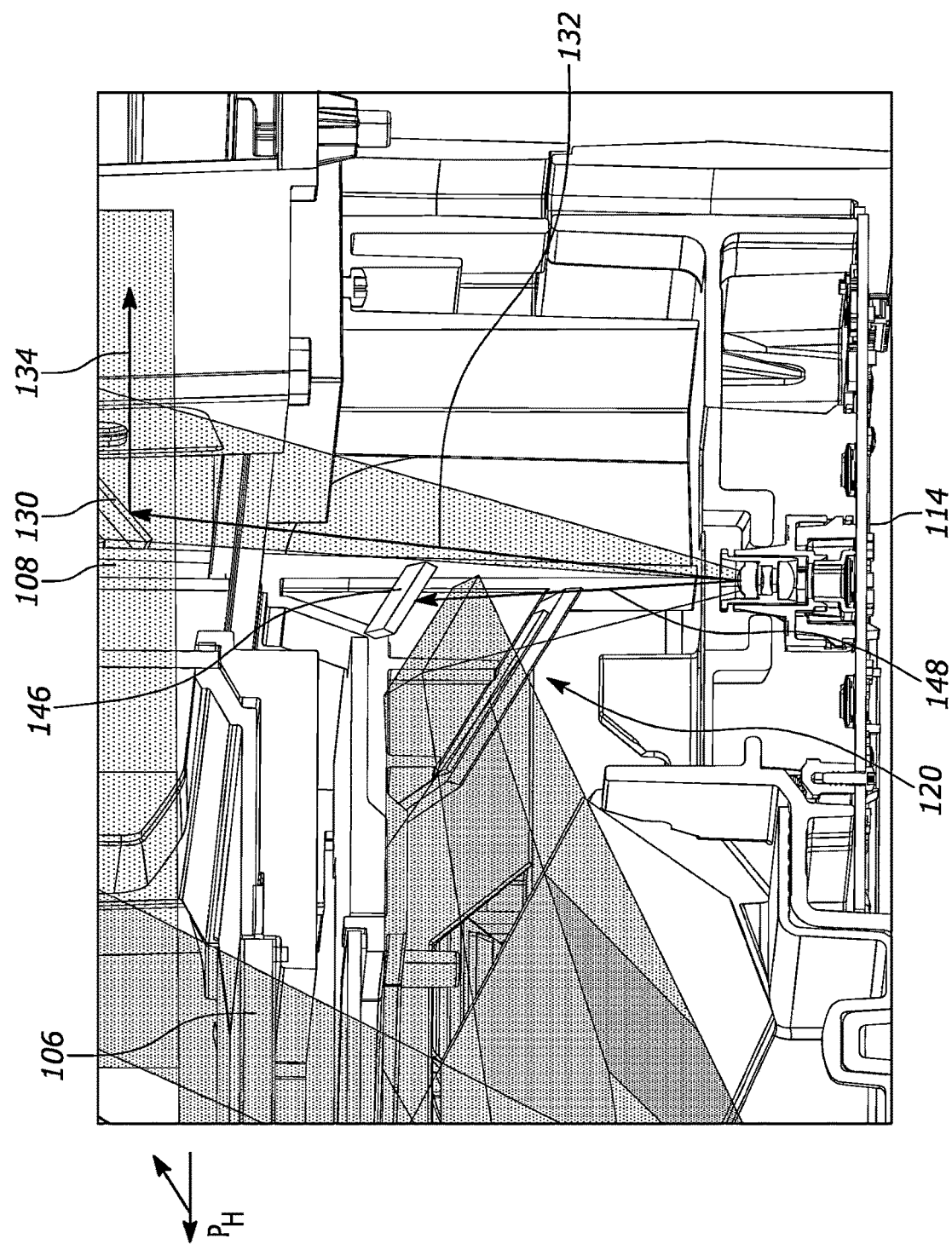
FIG. 4 is an enlarged side cross-sectional view of the bioptic barcode reader of FIGS. 1-3.
Figure 5:
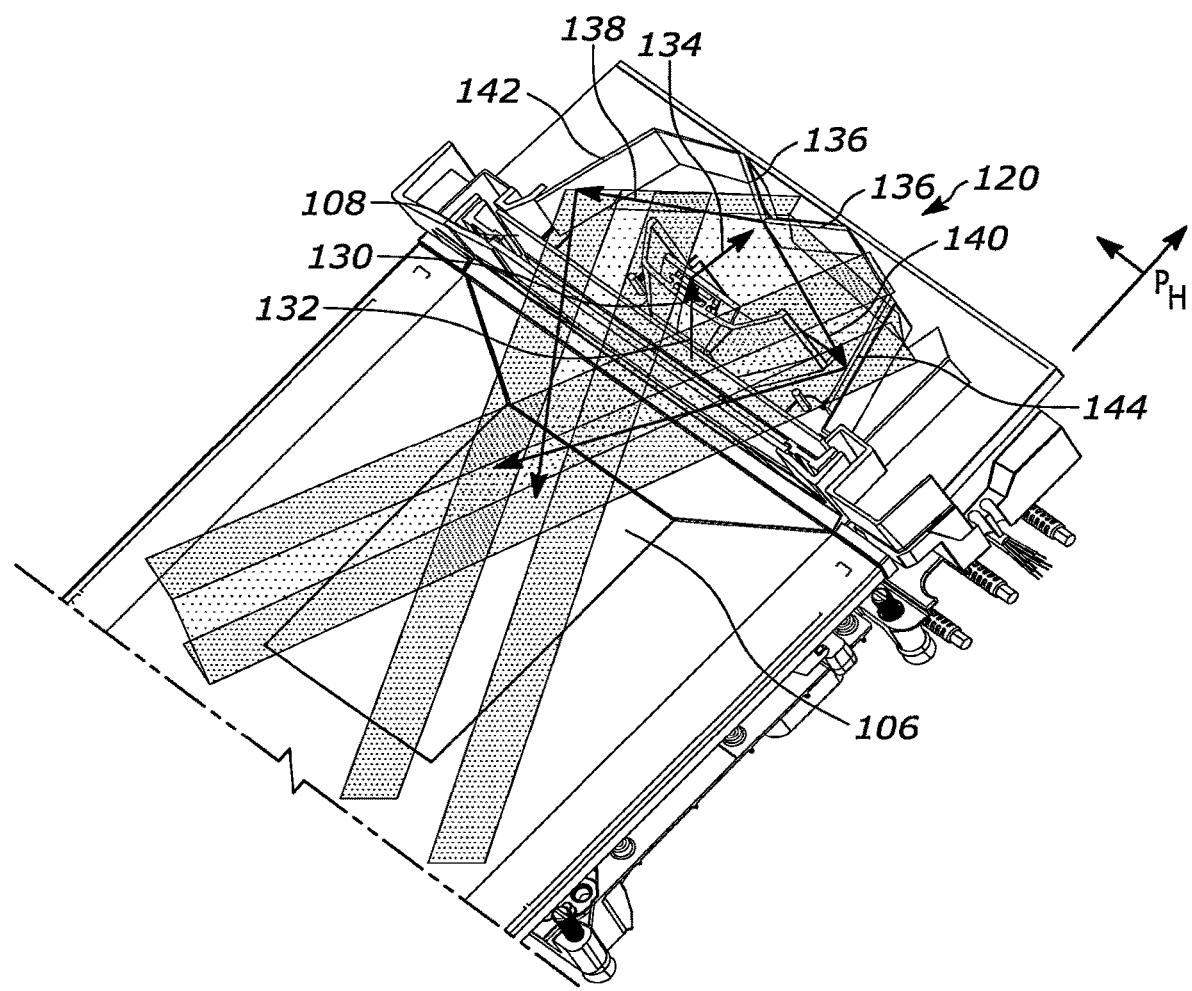
FIG. 5 is a top cutaway view of the imaging assembly pathways associated with a generally upright window of the bioptic barcode reader of FIGS. 1-4.

FIG. 4 and FIG. 5 together show the paths of the mirror arrangement 120 from the image sensor 114 to the generally upright window 108. As shown in FIGS. 4 and 5, the mirror arrangement 120 has a first fold mirror 130 positioned directly within a first path 132 of a first portion of the primary FOV. The first fold mirror 130 redirects the first portion of the primary FOV from the first path 132 to a second path 134. Referring now exclusively to FIG. 5, a first set of splitter mirrors 136 is positioned directly within the second path 134. More specifically, as shown, the first set of splitter mirrors 136 is located above a plane $P_H$ defined by the generally horizontal window 106 relative to the imaging assembly 112. The first set of splitter mirrors 136 splits the first portion of the primary FOV into a first subfield and a second subfield. The first subfield is directed by the first set of splitter mirrors 136 along a third path 138. The second subfield is directed by the first set of splitter mirrors 136 along a fourth path 140. A second fold mirror 142 is positioned directly within the third path 138 and redirects the first subfield through the generally upright window 108. A third fold mirror 144 is positioned directly within the fourth path 140 and redirects the second subfield through the generally upright window 108. As shown in FIG. 5, upon being redirected by the first set of splitter mirrors 136, the first subfield and the second subfield at least partially overlap.

Figure 6:
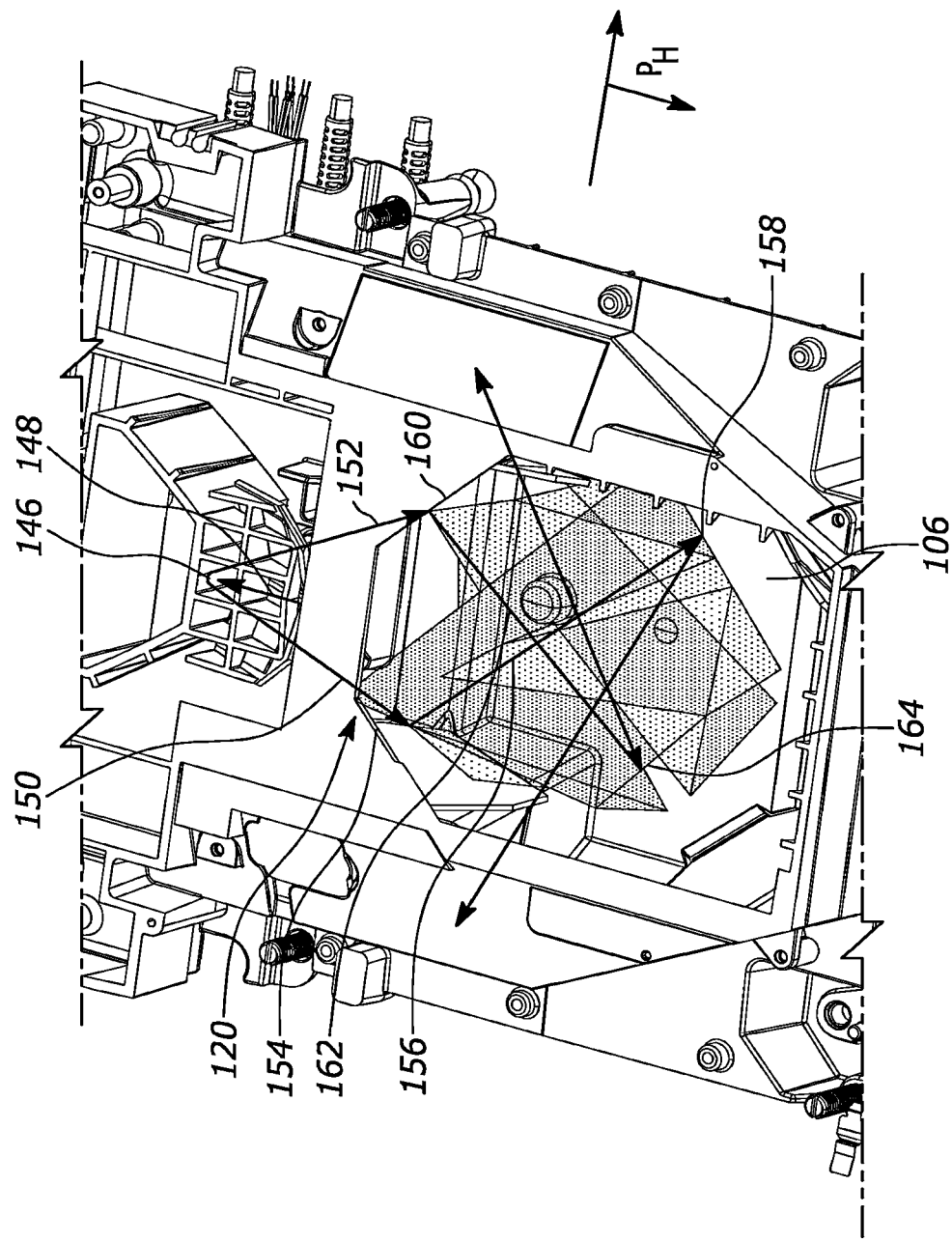
FIG. 6 is a top cutaway view of the imaging assembly pathways associated with the generally horizontal window of the bioptic barcode reader of FIGS. 1-5.

FIG. 4 and FIG. 6 together show the paths of the mirror arrangement 120 from the image sensor 114 to the generally horizontal window 106. As shown in FIGS. 4 and 6, a second set of splitter mirrors 146 is positioned directly within a fifth path 148 of a second portion of the primary FOV. The second set of splitter mirrors 146 is located below the plane $P_H$ defined by the generally horizontal window 106 relative to the imaging assembly 112. The second set of splitter mirrors 146 splits the second portion of the primary FOV into a third subfield and a fourth subfield. Referring now exclusively to FIG. 6, the second set of splitter mirrors 146 redirects the third subfield along a sixth path 150 and redirects the fourth subfield along a seventh path 152. A fourth fold mirror 154 is positioned directly within the sixth path 150 and redirects the third subfield along an eighth path 156. A fifth fold mirror 158 is positioned directly within the eighth path 156 and redirects the third subfield through the generally horizontal window 106. A sixth fold mirror 160 is positioned directly within the seventh path 152 and redirects the fourth subfield along a ninth path 162. A seventh fold mirror 164 is positioned directly within the ninth path 162 and redirects the fourth subfield through the generally horizontal window 106. As shown in FIG. 6, upon being redirected by the second set of splitter mirrors 146, the third subfield and the fourth subfield at least partially overlap.

Figure 7:
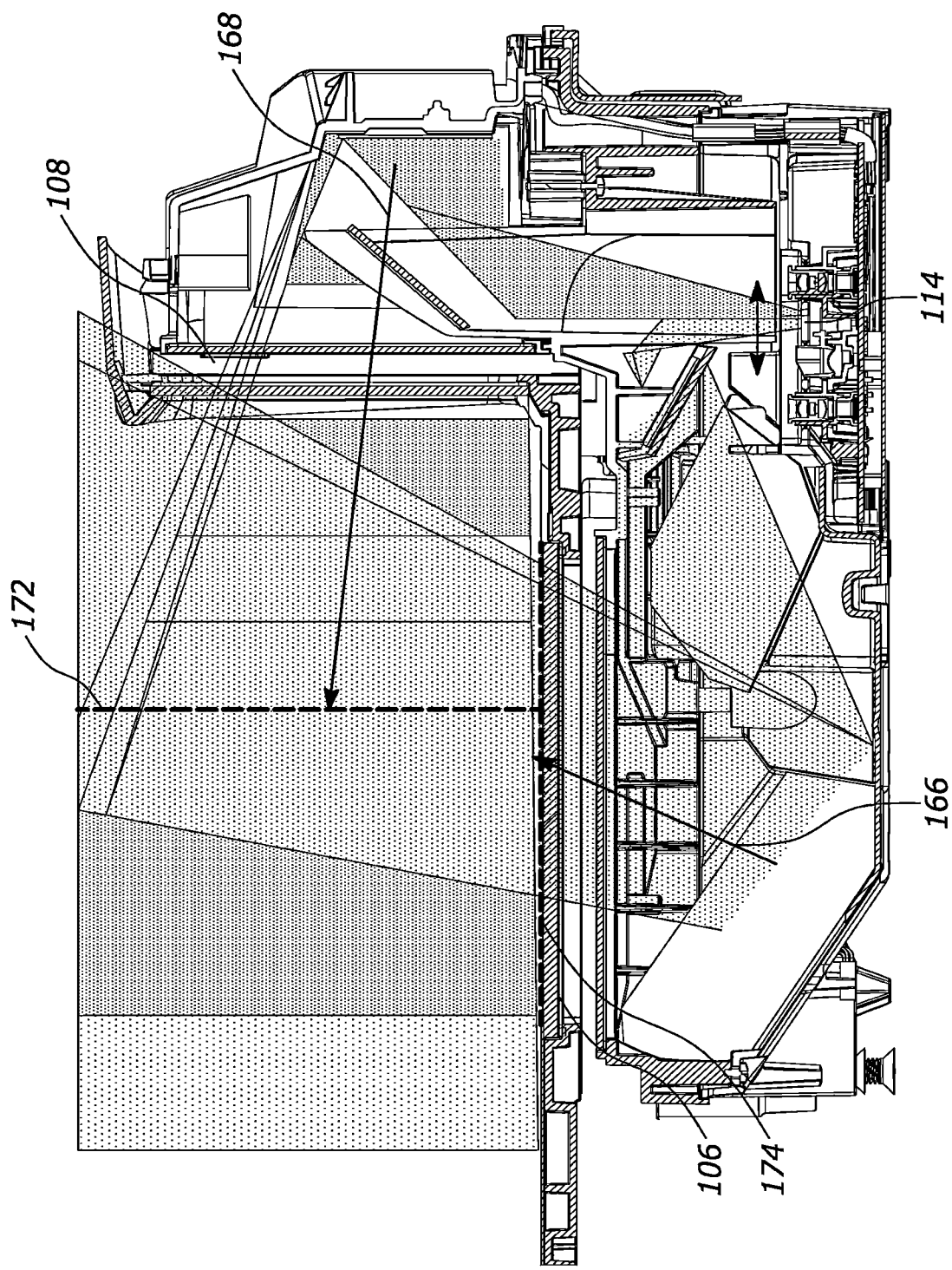
FIG. 7 is a side cross-sectional view of the bioptic reader of FIGS. 1-6 illustrating optical lengths from the image sensor to the generally horizontal window and the generally upright window.

FIG. 7 shows the relative optical lengths from the image sensor 114 to the generally horizontal window 106 and the generally upright window 108. A first optical length 166 (partially depicted in FIG. 7) extends from the image sensor 114 to the generally horizontal widow 106. The first optical length 166 is measured along the primary FOV and either the third subfield or the fourth subfield, both of which pass through the generally horizontal window 106. A second optical length 168 (partially depicted in FIG. 7) extends from the image sensor 114 to the generally upright window 108. The second optical length 168 is measured along the primary FOV and either the first subfield or the second subfield, both of which pass through the generally upright window 108. The first optical length 166 is different than the second optical length 168. More specifically, the first optical length 166 is longer than the second optical length 168. The first optical length 166 and the second optical length 168 can be adjusted by moving the image sensor 114 forward or backward. This allows a vertical focus distance 172 and a horizontal focus distance 174 to be determined. For example, the horizontal focus distance 174 may be set at the generally horizontal window 106 and the vertical focus distance 172 may be located above the generally horizontal window 106 approximately one-third of the way across the generally horizontal window 106 from the generally upright window 108.

The bioptic barcode reader 100 disclosed herein offers numerous advantages. Using only a single image sensor 114 reduces the overall cost of the bioptic barcode reader 100, while the efficacy of the bioptic barcode reader 100 is not reduced thanks to the design of the imaging assembly 112 and the mirror arrangement 120. Further, a single mirror arrangement 120 and lens assembly is required. This further drives down the overall cost of the bioptic barcode reader 100. The bioptic barcode reader 100 also offers the option to adjust the ratios between the first quadrant 122, second quadrant 124, third quadrant 126, and fourth quadrant 128. Depending on the requirements of the bioptic barcode reader 100, the fields of view can be enlarged vertically or horizontally by changing the split between the fields of view.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. Additionally, the described embodiments/examples/implementations should not be interpreted as mutually exclusive, and should instead be understood as potentially combinable if such combinations are permissive in any way. In other words, any feature disclosed in any of the aforementioned embodiments/examples/implementations may be included in any of the other aforementioned embodiments/examples/implementations.

The benefits, advantages, solutions to problems, and any element(s) that may cause any benefit, advantage, or solution to occur or become more pronounced are not to be construed as a critical, required, or essential features or elements of any or all the claims. The claimed invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter may lie in less than all features of a single disclosed embodiment. Thus, the following claims are hereby incorporated into the Detailed Description, with each claim standing on its own as a separately claimed subject matter.

The invention claimed is:

1. A bioptic barcode reader for capturing images of targets presented in a product-scanning region of the bioptic barcode reader, the bioptic barcode reader comprising:
   a housing having an interior region;
   an imaging assembly having a primary FOV, the imaging assembly including an image sensor with a plurality of photosensitive elements forming a substantially flat surface;
   a decode module communicatively coupled to the imaging assembly and configured to decode a barcode captured in an image by the imaging assembly;
   a generally horizontal window supported by the housing, the generally horizontal window configured to allow a first light to pass between the product-scanning region and the interior region of the housing;
   a generally upright window supported by the housing, the generally upright window configured to allow a second light to pass between the product-scanning region and the interior region of the housing; and
   a mirror arrangement positioned within the interior region, the mirror arrangement configured to divide the primary FOV into a plurality of subfields,
   wherein the mirror arrangement is further configured to
      (i) redirect at least one of the plurality of subfields through the generally horizontal window and
      (ii) redirect at least another one of the plurality of subfields through the generally upright window, and
   wherein the bioptic barcode reader has no other imaging assembly communicatively coupled to the decode module and used to process images for decoding indicia.

2. The bioptic barcode reader of claim 1,
   wherein the plurality of subfields includes a first subfield, a second subfield, a third subfield, and a fourth subfield, and
   wherein the first subfield is associated with a first quadrant of the substantially flat surface of the image sensor, the second subfield is associated with a second quadrant of the substantially flat surface of the image sensor, the third subfield is associated with a third quadrant of the substantially flat surface of the image sensor, and the fourth subfield is associated with a fourth quadrant of the substantially flat surface of the image sensor.

3. The bioptic barcode reader of claim 2, wherein each of the first quadrant, the second quadrant, the third quadrant, and the fourth quadrant is dimensionally equal to each other of the first quadrant, the second quadrant, the third quadrant, and the fourth quadrant.

4. The bioptic barcode reader of claim 2, wherein each of the first quadrant, the second quadrant, the third quadrant, and the fourth quadrant is a proportionally equal portion of the substantially flat surface of the image sensor.

5. The bioptic barcode reader of claim 2, wherein an orientation of each of the first quadrant, the second quadrant, the third quadrant, and the fourth quadrant is equal to an orientation of the substantially flat surface of the image sensor.

6. The bioptic barcode reader of claim 1, wherein the mirror arrangement includes:
   a first fold mirror positioned directly within a first path of a first portion of the primary FOV, the first fold mirror configured to redirect the first portion of the primary FOV from a first path to a second path;
   a first set of splitter mirrors positioned directly within the second path, the first set of splitter mirrors configured to split the first portion of the primary FOV into a first subfield and a second subfield, the first set of splitter mirrors further configured to (i) redirect the first subfield along a third path and (ii) redirect the second subfield along a fourth path;
   a second fold mirror positioned directly within the third path and configured to redirect the first subfield through the generally upright window; and
   a third fold mirror positioned directly within the fourth path and configured to redirect the second subfield through the generally upright window.

7. The bioptic barcode reader of claim 6, wherein upon being redirected by the first set of splitter mirrors, the first subfield and the second subfield at least partially overlap.

8. The bioptic barcode reader of claim 6, wherein the mirror arrangement further includes:
   a second set of splitter mirrors positioned directly within a fifth path of a second portion of the primary FOV, the second set of splitter mirrors configured to split the second portion of the primary FOV into a third subfield and a fourth subfield, the second set of splitter mirrors further configured to (i) redirect the third subfield along a sixth path and (ii) redirect the fourth subfield along a seventh path;
   a fourth fold mirror positioned directly within the sixth path and configured to redirect the third subfield along an eighth path;
   a fifth fold mirror positioned directly within the eighth path and configured to redirect the third subfield through the generally horizontal window;
   a sixth fold mirror positioned directly within the seventh path and configured to redirect the fourth subfield along a ninth path; and
   a seventh fold mirror positioned directly within the ninth path and configured to redirect the fourth subfield through the generally horizontal window, and
   wherein at least one of (i) upon being redirected by the first set of splitter mirrors, the first subfield and the second subfield at least partially overlap, and (ii) upon being redirected by the second set of splitter mirrors, the third subfield and the fourth subfield at least partially overlap.

9. The bioptic barcode reader of claim 6, a second set of splitter mirrors positioned directly within a fifth path of a second portion of the primary FOV, the second set of splitter mirrors configured to split the second portion of the primary FOV into a third subfield and a fourth subfield, the second set of splitter mirrors further configured to (i) redirect the third subfield along a sixth path and (ii) redirect the fourth subfield along a seventh path;
   a fourth fold mirror positioned directly within the sixth path and configured to redirect the third subfield along an eighth path;
   a fifth fold mirror positioned directly within the eighth path and configured to redirect the third subfield through the generally horizontal window;
   a sixth fold mirror positioned directly within the seventh path and configured to redirect the fourth subfield along a ninth path; and
   a seventh fold mirror positioned directly within the ninth path and configured to redirect the fourth subfield through the generally horizontal window, and
   wherein the first set of splitter mirrors is located above a plane defined by the generally horizontal window relative to the imaging assembly.

10. The bioptic barcode reader of claim 9, wherein the second set of splitter mirrors is located below the plane defined by the generally horizontal window relative to the imaging assembly.

11. The bioptic barcode reader of claim 1, wherein a first optical length from the image sensor to the generally horizontal window is different from a second optical length from the image sensor to the generally upright window, first optical length being measured along the primary FOV and one of the plurality of subfields that passes through the generally horizontal window, the second optical length being measured along the primary FOV and one of the plurality of subfields that passes through the generally upright window, and
   wherein the first optical length is longer than the second optical length.

* * * * *